United States Patent [19]
Ocker et al.

[11] 3,744,770
[45] July 10, 1973

[54] SCREW EXTRUDER

[75] Inventors: Herbert Ocker, Leonberg; Dieter Buchheit, Ditzingen, both of Germany

[73] Assignee: Werner & Pfleiderer, Stuttgart-Ferrerbach, Germany

[22] Filed: Aug. 25, 1971

[21] Appl. No.: 174,801

[30] Foreign Application Priority Data
Sept. 4, 1970 Germany.................. P 20 43 833.9

[52] U.S. Cl. ............................................... 259/192
[51] Int. Cl. ................................................ B01f 7/08
[58] Field of Search...................... 259/192, 193, 6, 259/104, 5, 21, 41

[56] References Cited
UNITED STATES PATENTS
3,085,288  4/1963  Street................................. 259/192
3,305,894  2/1967  Boden................................. 259/192
3,203,370  8/1965  Haug.................................. 259/192

*Primary Examiner*—Robert W. Jenkins
*Attorney*—Frederick E. Hane et al.

[57] ABSTRACT

A screw extruder for processing melts of synthetic plastic materials or synthetic plastic material in powder or granulated form to effect mixing, kneading and homogenizing of the material and causing chemical reactions thereof comprises a long main conveyor screw and a short auxiliary screw parallel thereto and disposed in the feed zone of the casing of the extruder. The screws are unidirectionally rotated in tight engagement with each other.

5 Claims, 4 Drawing Figures

INVENTORS
HERBERT OCKER
DIETER BUCHHEIT

*INVENTORS*
HERBERT OCKER
DIETER BUCHHEIT
*ATTORNEYS*

3,744,770

SCREW EXTRUDER

The invention relates to a screw extruder with a single conveyor screw, and more particularly to a single-screw extruder for processing melts of synthetic plastic materials and synthetic plastic material in powder or granulated form to effect mixing, kneading, homogenizing, dyeing and degasing of the material to be processed and also to cause chemical reactions thereof.

BACKGROUND

Single-screw screw extruders if suitably dimensioned are generally quite satisfactory for carrying out the hereinbefore referred to procedural steps. In fact, the kneading action of single-screw extruders in many instances is superior to that of twin-screw screw extruders the screw elements of which mesh though not with a tight profile. However, single-screw screw extruders have inherently certain disadvantages. The dwell time of the material within the extruder cannot be kept constant within a narrow range and such constancy of the dwell time is very important for most of the processing operations which are to be carried out in the extruders. Moreover, a positive and uniform flow of the material to be processed through treatment zones of the extruder cannot be reliably obtained with single-screw screw extruders, especially if quantity processing is to be carried out.

Twin-screw extruders, the screws of which are in tight engagement and which are unidirectionally rotated produce high quality dispersion and satisfy to a high degree the other aforelisted condition. They also permit adequate constancy of the dwell time and produce due to the manner in which they are constructed positive and substantially uniform flow of the material and substantially uniform and predictable processing of the material fed into the extruders in the zones thereof to which are assigned the respective stages of the processing. However, twin-screw extruders are extremely expensive due to the complexity of the structure thereof and as a result use of twin-screw extruders is often not economically acceptable as it is well known to experts in the art.

Various other means such as feed-in rollers and conical feed-in screws have been proposed for single-screw extruders so as to improve the feed-in and the flow of the material, and also to increase the quantity of the material that can be processed. As it is well known in the art, overfeeding and underfeeding, especially in the first few turns of the conveyor screw, that is, in the turns adjacent to the feed port of the extruder, have a particularly strong effect on the over-all performance of the extruders.

It has been proposed to provide in the feed zone of a single-screw extruder an auxiliary screw which is parallel and rotated in opposition to the main conveyor screw of the extruder and which is in mesh with the turns of the main screw though not in tight engagement therewith. Such an arrangement serves primarily to improve the kneading action in the extruder, for which purpose the main screw and the auxiliary screw usually have different diameters.

Tests have shown that the provision of a parallel and meshing auxiliary screw rotated in opposition to the main screw and disposed in the feed zone of a one-screw screw conveyor does not provide a better solution of the aforepointed out disadvantages than the aforediscussed extruders without an auxiliary screw.

THE INVENTION

It is a broad object of the invention to provide a novel and improved single-screw conveyor of the general kind above referred to which has all the aforepointed out advantages of twin-screw extruders in which the two screws are unidirectionally rotated and engage each other with a tight profile or engagement without being as complex and hence as expensive as the now known twin-screw screw extruders.

The aforediscussed known extruders also do not provide a predictable forced flow of the material through the feed zone as it is necessary for obtaining a fully satisfactory output — either with respect to the total output or with respect to the individual particles of which the material to be processed is composed. Moreover, extruders as now known have inherently a certain pumping action or at least do not prevent such pumping action. As a result, there are pressure differentials in the treatment of the extruder, and as a result a non-uniform mixture of the material, variations in the dyeing action, a non-uniform plastification and other faults in the material occur rather frequently.

Extensive tests and actual operation of an extruder according to the invention have shown that an extruder according to the invention fully avoids the aforepointed out disadvantages of known extruders without increasing the costs of the extruder to a non-acceptable level.

SUMMARY OF THE INVENTION

The aforepointed out objects, features and advantages, and other objects, features and advantages are obtained by providing in the extruder an auxiliary screw which is rotated unidirectionally with the main screw meshing therewith. Both the auxiliary screw and the turns of the main screw are provided with a tight profile within their range of engagement with each other. It has been found that such an extruder produces relatively very high outputs of material which is processed in a predictable manner and has a quality which heretofore could be achieved only by using very much more costly afore-mentioned twin-screw extruders, with specially shaped tightly meshing screw elements.

It has been found advantageous, at least for certain treatments, to form the turns of the meshing screw elements with a round profile as such profile has a particularly high conveying capability.

The invention also provides that at least the meshing portions of both the auxiliary screw and the main screw are formed with multiple threads thereby still further increasing the total output of the extruder.

It has further been been found that particularly good results are obtained by selecting the length of the auxiliary screw in mesh with the main screw so that it is about three to five times the diameter of its outer peripheral outline.

As it is readily apparent to experts in the art an extruder according to the invention has all the advantages of twin-screw extruders without the high costs of such extruders in case backwards degasing is to be used. This is due to the large surfaces at the respective face ends of the extruder.

DETAILED DESCRIPTION OF AN EMBODIMENT OF THE INVENTION

In the accompanying drawing, several preferred embodiments of the invention are shown by way of illustration and not by way of limitation.

Figure 3:
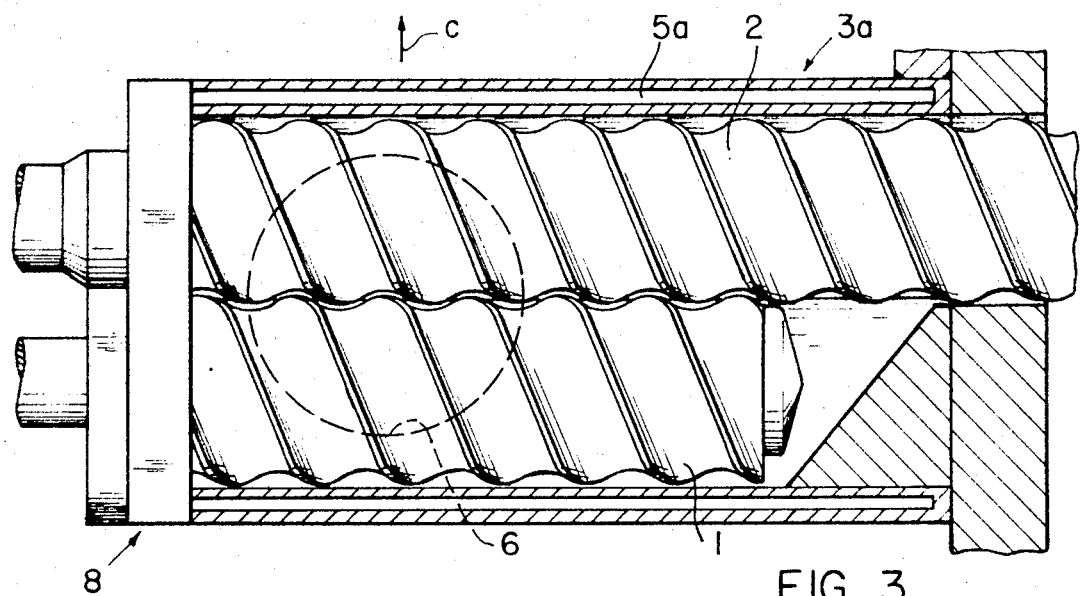
FIG. 3 is a fragmentary side view of FIG. 1, partly in section, showing the feed zone of the extruder on a larger scale and in greater detail.

Referring now to the figures in greater detail, the exemplified extruder comprises an elongate casing 10 preferably composed of several sections 3. There are shown three treatment sections or zones 3 and a feed section or zone 3a. The sections are suitably and detachably secured to each other, for instance by flanges and screw bolts (not shown). The treatment sections 3 preferably include heating or cooling ducts 5 and such ducts may also be provided in the feed zone 3a, as it is shown in FIG. 3 at 5a.

The extruder comprises a main screw 2 rotatably mounted in casing 10 and extending through substantially the entire length of the casing. The material to be processed is fed into the casing through a feed port 6 shown to be of circular cross-section as such type of port reduces the overall length of the extruder. The processed material is discharged through discharge port or end 4. Suitable dies or nozzles may, of course, be provided at the end 4. The casing may include one or more degasing ports 7. There may also be ports for feeding additives such as dyes into the casing as it is well known in the art.

Figure 1:
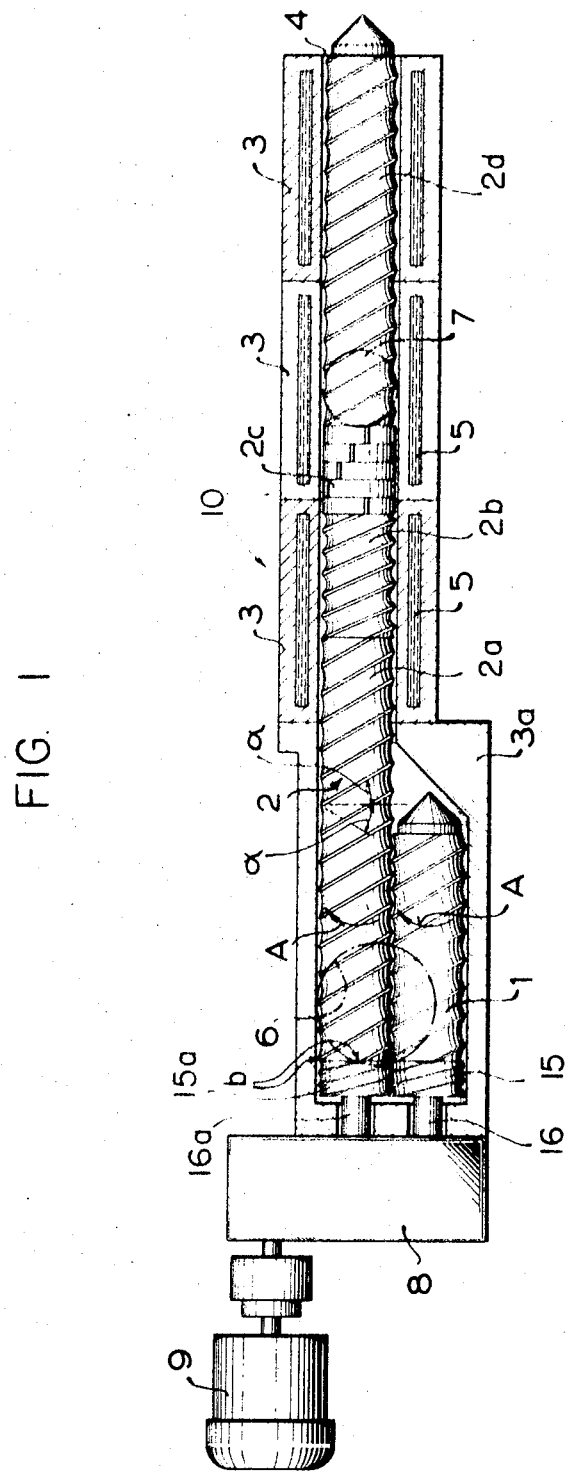
FIG. 1 is a diagrammatic lengthwise section of a screw extruder according to the invention.
Figure 2:
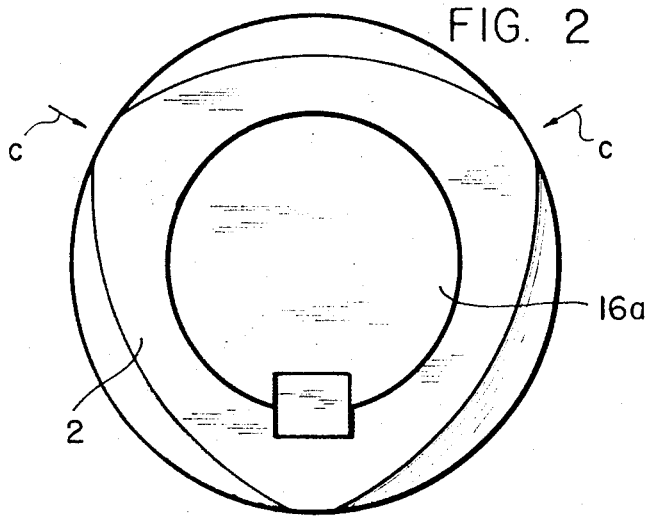
FIG. 2 is an end view upon either one of the screws of the extruder shown in FIG. 1.

Main screw 2 coacts with an auxiliary screw 1 which is disposed in the feed zone 3a of the extruder, as it is clearly shown in FIG. 1. The two screws are parallel and mesh in tight engagement. Both the auxiliary screw and the main screw (the latter at least for the part which is in mesh with the auxiliary screw), are preferably multiple thread screws. This is shown in FIG. 1 by the angles $a$ defined by the threads relative to the lengthwise axis of screw 2 and also by the location of the section points of the threads with the face end of the screw as it is indicated by an arrow $b$. It is further shown in FIG. 2 which is an end view of screw 2. This figure shows clearly the three threads. The indicated three areas $c$ represent the contact areas of the threads with an imaginary circle representing the outer circumference of the screw. FIG. 2 also shows the shaft 16a to which the screw threads are keyed. Multiple thread screws of the kind here described are conventionally produced in the form of a sleeve which is slid upon a shaft and then keyed thereto. The explanations made herein with respect to main screw 2 apply to auxiliary screw 1, that is, this screw is also a three-thread screw keyed to a shaft 16. Of course, more or less than three threads may be provided.

Both screws preferably have at their feed end steep turns 15 and 15a respectively, to prevent backflow of material fed into the casing through feed port 6.

The two screws are unidirectionally rotated by a motor 9 which is coupled to shafts 16 and 16a through a suitable and conventional gear train 8. This gear train is not shown in detail as it does not constitute part of the invention.

Referring to FIG. 3, this figure shows that the turns or threads of auxiliary screw 1 and main screw 2 are so shaped that the screws are in tight engagement with each other.

Figure 4:
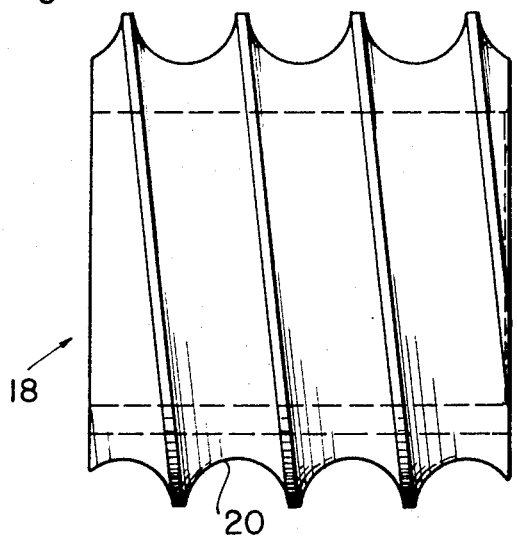
FIG. 4 is a fragmentary view of a modification of the profile of either one or both of the screws of the extruder.

FIG. 4 shows a round profile 20 which may be used for both screws at least for the lengths of the screws in engagement with each other as such round profile has a very favorable conveying capability.

The length of auxiliary screw 1 is preferably such that it is about three to five times the diameter of the circumference of the screw.

The arrangement of the screw turns along the length of main screw 2 is, of course, selected in accordance with the specific treatment to be carried out in the extruder. As it is shown in FIG. 1, screw 2 is preferably divided into several sections so that an exchange of individual sections can be readily effected, thereby varying the treatment action of the extruder as required. More specifically, there is shown a section 2a with turns of a high pitch extending through the feed zone and also somewhat downstream thereof. Section 2a is followed downstream by a section 2b with turns having a steeper pitch. Moreover, kneading discs 2c may be interposed to obtain a particularly powerful mixing action as the material is conveyed toward the discharge end 4 of the extruder by the turns of a section 2d.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A single screw extruder for processing melts of synthetic plastic material and synthetic plastic materials in powder or granulated form, said screw extruder comprising in combination:

an elongate casing having at one end a feed zone including a feed port and at the other end a discharge port;

a long main conveyor screw rotatably mounted in said casing and extending through substantially the length thereof, said screw and casing defining adjacent to the feed port a feed-in zone, the remaining lengths of the casing and the screw constituting a treatment zone;

a short auxiliary screw rotatably mounted in said casing and terminating at the end of the feed-in zone as defined by the screw and the casing, said screws being in parallel and the turns thereof in tight engagement with each other; and drive means for unidirectionally rotating said screws.

2. The screw extruder according to claim 1 wherein the auxiliary screw along its entire length and the main screw at least along its portion in tight engagement with the auxiliary screw have screw turns with a round profile.

3. The screw extruder according to claim 1 wherein the lengths of the main screw and of the auxiliary screw in tight engagement with each other have multiple threads.

4. The screw extruder according to claim 1 wherein the length of the auxiliary screw is about three to five times the diameter of the circumference of the same.

5. The screw extruder according to claim 1 wherein the main screw includes a plurality of kneading discs intermediate said ports in the casing, and the casing includes a degasing opening downstream of said kneading discs.

* * * * *